(12) United States Patent
Cevik et al.

(10) Patent No.: US 12,221,221 B2
(45) Date of Patent: Feb. 11, 2025

(54) SUB-IDLE HYBRID OPERATION MODE FOR HYBRID ELECTRIC PROPULSION SYSTEM

(71) Applicant: PRATT & WHITNEY CANADA CORP., Longueuil (CA)

(72) Inventors: Mert Cevik, Boucherville (CA); James Robert Jarvo, Long Sault (CA); Keith Morgan, Westmount (CA); Elizabeth Gioia, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/441,405

(22) Filed: Feb. 14, 2024

(65) Prior Publication Data

US 2024/0270398 A1    Aug. 15, 2024

Related U.S. Application Data

(60) Provisional application No. 63/484,761, filed on Feb. 14, 2023.

(51) Int. Cl.
*B64D 31/18* (2024.01)
*B64D 27/33* (2024.01)

(52) U.S. Cl.
CPC ............. *B64D 31/18* (2024.01); *B64D 27/33* (2024.01)

(58) Field of Classification Search
CPC ................................ B64D 31/18; B64D 27/33
See application file for complete search history.

(56) References Cited

U.S. PATENT DOCUMENTS

| | | | |
|---|---|---|---|
| 10,151,246 B2 | 12/2018 | Poumarede et al. | |
| 10,337,409 B2 | 7/2019 | Bedrine et al. | |
| 10,696,178 B2 | 6/2020 | Mcroberts et al. | |
| 10,737,795 B2 | 8/2020 | Moulon et al. | |
| 10,766,629 B2 | 9/2020 | Mercier-Calvairac et al. | |
| 10,822,100 B2 | 11/2020 | Dindar et al. | |
| 10,981,660 B2 | 4/2021 | Mackin | |
| 11,130,411 B2 | 9/2021 | Mcroberts et al. | |
| 11,149,649 B2 | 10/2021 | Terwilliger et al. | |
| 11,161,603 B2 | 11/2021 | Vallart et al. | |
| 11,549,464 B2 | 1/2023 | Terwilliger et al. | |
| 2019/0002115 A1* | 1/2019 | Miller | B64D 31/06 |
| 2020/0010065 A1* | 1/2020 | Books | B60T 8/32 |
| 2020/0056546 A1* | 2/2020 | Terwilliger | F02C 9/26 |
| 2020/0277063 A1 | 9/2020 | Thomassin et al. | |
| 2020/0277064 A1 | 9/2020 | Thomassin et al. | |

(Continued)

*Primary Examiner* — Hoang M Nguyen
(74) *Attorney, Agent, or Firm* — NORTON ROSE FULBRIGHT CANADA LLP

(57) ABSTRACT

A method of operating a hybrid engine for an aircraft, the hybrid engine having a thermal engine and an electric motor. The method includes verifying, using an engine control unit of the hybrid engine, that a selected power level is under a predetermined threshold for operation of the hybrid engine in a sub-idle hybrid mode. The method further includes operating the hybrid engine in the sub-idle hybrid mode, using the engine control unit, by controlling the thermal engine to operate in a standby mode, and by controlling the electric motor to operate in an active mode wherein the electric motor provides a majority of a propulsive power to the aircraft, wherein in the standby mode the thermal engine operates in a sub-idle condition to provide at most minimal propulsive power to the aircraft.

18 Claims, 7 Drawing Sheets

(56) References Cited

U.S. PATENT DOCUMENTS

| | | |
|---|---|---|
| 2021/0025339 A1* | 1/2021 | Terwilliger ............ B64D 27/02 |
| 2022/0009615 A1 | 1/2022 | Mark et al. |
| 2022/0081122 A1 | 3/2022 | Gazzino |
| 2022/0135240 A1* | 5/2022 | Imel ...................... B64D 35/08 |
| | | 60/716 |
| 2023/0011896 A1 | 1/2023 | Serr et al. |
| 2023/0021937 A1 | 1/2023 | Detweiler et al. |
| 2023/0036374 A1 | 2/2023 | Coutu et al. |

* cited by examiner

SUB-IDLE HYBRID OPERATION MODE FOR HYBRID ELECTRIC PROPULSION SYSTEM

CROSS-REFERENCE TO RELATED APPLICATIONS

The present application claims priority on U.S. patent application No. 63/484,761 filed Feb. 14, 2023, the entire contents of which are incorporated herein by reference.

TECHNICAL FIELD

The present disclosure relates generally to aircraft propulsion systems and, more particularly, to a hybrid aircraft engine.

BACKGROUND

Hybrid electric propulsion systems for aircraft combine combustion (or "thermal") and electric propulsion technologies. In an electric propulsion system, electrical energy is converted to rotational energy by an electric motor to drive a rotor, such as a propeller. The thermal engine also provides power output to drive the rotor. There are environmental and cost benefits to having at least a portion of the power for an aircraft propulsion system to come from electric motors.

Continued improvement of hybrid electric propulsion systems is sought.

SUMMARY

The present disclosure provides a "sub-idle" hybrid operation mode for an hybrid electric propulsion system for an aircraft, and more particularly a hybrid engine having both a thermal engine and an electric motor, which combines the benefits of sub-idle engine operation of the thermal engine and the use of an electric motor, wherein the electric motor can function as the main power source for propulsion/thrust of the aircraft while the thermal engine operates in a low-power standby condition which is sufficient to enable propeller control and maintain the thermal engine running but without contributing propulsive thrust to the aircraft. By operating the hybrid engine in the sub-idle hybrid operation mode as described herein, thermal engine and electric motor use can be controlled and optimized to reduce overall fuel consumption.

In one aspect, there is provided a method of operating a hybrid engine for an aircraft, the hybrid engine having a thermal engine and an electric motor, the method comprising: verifying, using an engine control unit of the hybrid engine, that a selected power level is under a predetermined threshold for operation of the hybrid engine in a sub-idle hybrid mode; and operating the hybrid engine in the sub-idle hybrid mode, using the engine control unit, by controlling the thermal engine to operate in a standby mode, and by controlling the electric motor to operate in an active mode wherein the electric motor provides a majority of a propulsive power to the aircraft, wherein in the standby mode the thermal engine operates in a sub-idle condition to provide at most minimal propulsive power to the aircraft.

In another aspect, there is provided a method of operating a hybrid turboprop engine for an aircraft, the hybrid turboprop engine having a thermal engine, an electric motor and a propeller control system in communication with a propeller, the method comprising: verifying, using an engine control unit of the hybrid turboprop engine, that a selected power level is under a predetermined threshold for operation of the hybrid turboprop engine in a sub-idle hybrid mode; and using the engine control unit to operate the hybrid turboprop engine in the sub-idle hybrid mode, wherein the electric motor provides a majority of the propulsive power to the aircraft, by controlling the thermal engine to operate in a standby mode and the electric motor to operate in an active mode, wherein the thermal engine operating in the standby mode provides at most minimal propulsive power to the aircraft but generates output to operate the propeller control system.

In a further aspect, there is provided a method of operating a hybrid turboprop engine for an aircraft, the hybrid turboprop engine having a thermal engine, an electric motor, and a propeller control system, the method comprising: during a selected flight segment of the aircraft, using an engine control unit of the hybrid turboprop engine to control a first one of the thermal engine and the electric motor to operate in a standby mode, and to control the other of the thermal engine and the electric motor to provide a majority of the propulsive power to the propeller required for the selected flight segment; and upon completion of the selected flight segment, using the engine control unit to return the first one of the thermal engine and the electric motor to a baseline operating mode, wherein both the thermal engine and the electric motor contribute propulsive power to the propeller.

BRIEF DESCRIPTION OF THE DRAWINGS

Reference is now made to the accompanying figures in which.

DETAILED DESCRIPTION

Figure 1:
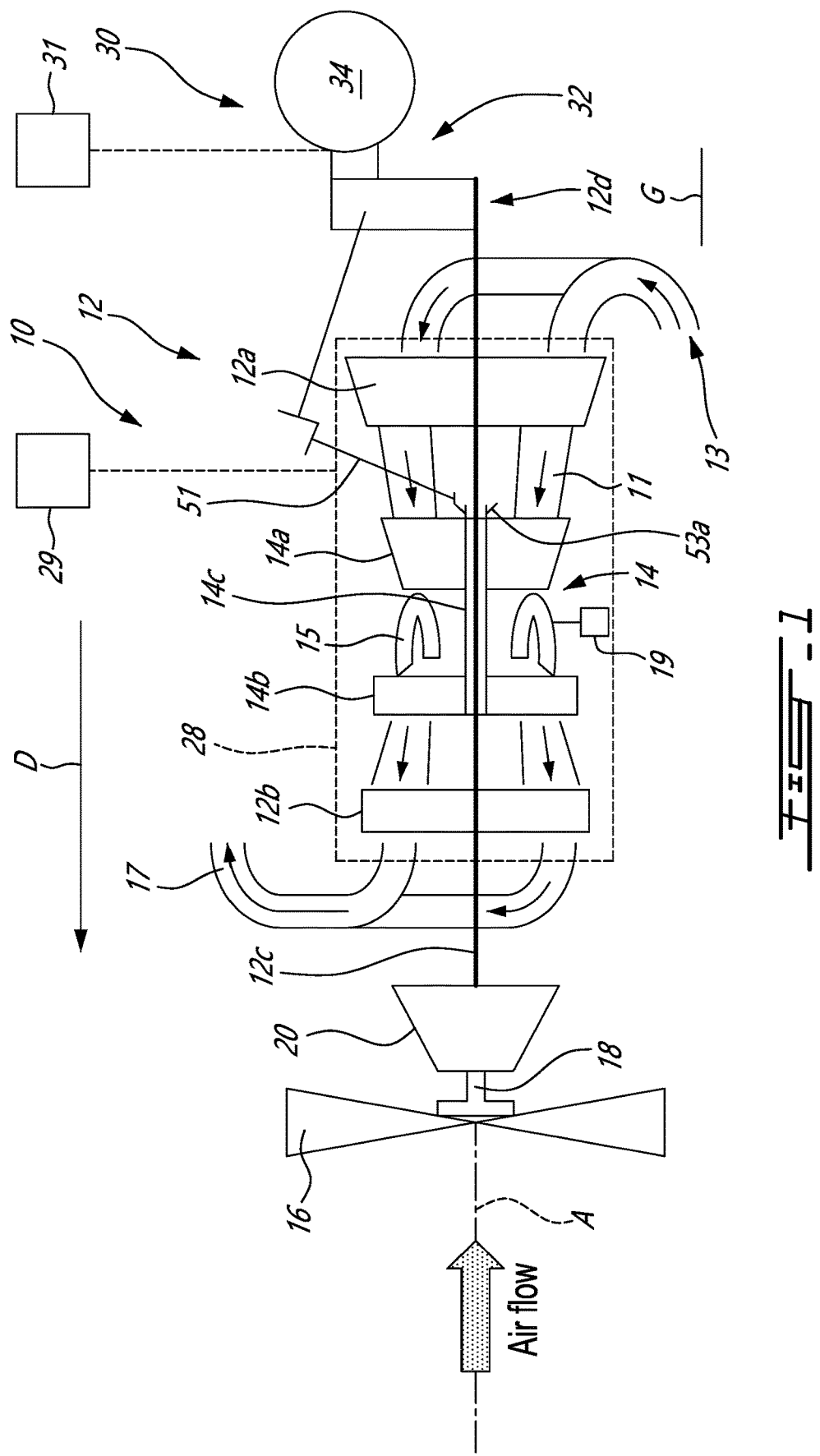
FIG. 1 is a side cross-sectional view of a hybrid aircraft engine in accordance with one embodiment, having a thermal engine and an electric motor.

FIG. 1 illustrates a first example of an hybrid electric propulsion system 10 (or simply "hybrid engine" 10) for an aircraft of a type preferably provided for use in subsonic flight, and generally comprising an engine core, also referred to as thermal engine 28 or thermal module 28, having turbomachinery with multiple spools which perform compression to pressurize atmospheric air received through an air inlet 13, and which extract energy from combustion gases before they exit the engine via an exhaust outlet 17. The engine core further comprises a core gaspath 11 to direct gases from the air inlet 13 to the exhaust outlet 17, as depicted by the flow arrows in FIG. 1. In the depicted embodiment, the core gaspath 11 is annular and is concentric relative to the engine central axis A. The term "spool" is herein intended to broadly refer to drivingly connected turbine and compressor rotors and is, thus, not limited to a compressor and turbine assembly on a single shaft. It also includes a rotary assembly with multiple shafts geared together.

In the embodiment shown in FIG. 1, the thermal engine 28 includes a low pressure (LP) spool 12 and a high pressure (HP) spool 14. The LP spool 12 generally comprises an LP compressor 12a for pressurizing air received from the air inlet 13 and an LP turbine 12b for extracting energy from combustion gases discharged from a combustor 15 in which compressed air is mixed with fuel provided by a fuel system 19 and ignited for generating an annular stream of hot combustion gases. The LP turbine 12b is herein connected mechanically to the LP compressor 12a via a LP shaft 12c. Flow communication between the two LP compressor 12a and the low pressure turbine 12b is through the high pressure spool 14 and the combustor 15 via the core gaspath 11. According to one aspect of the embodiment shown in FIG. 1, the LP compressor 12a and the LP turbine 12b are coaxially mounted for rotation about a common axis, which may correspond to the engine central axis A.

The thermal engine 28 of the hybrid engine 10 as depicted in FIG. 1 is a reverse-flow engine in that the air flows within the core gaspath 11 in the same direction as a direction of travel D of the hybrid engine 10 and thus the aircraft which is propels, i.e., wherein the air inlet 13 is located toward the aft of the engine relative to the direction of travel D of the engine and aircraft. This differs from a straight-flow type engine in which the air flows in a core gaspath in an opposite direction than that of travel. It will be appreciated that the present disclosure may be applied alternatively to a straight-flow engine.

The HP spool 14 generally comprises an HP compressor 14a connected in flow communication with the LP compressor 12a for receiving pressurized air therefrom via the core gaspath 11. The HP spool 14 further comprises an HP turbine 14b, which is located downstream of the combustor 15. The HP turbine 14b is drivingly connected to the HP compressor 14a via an HP shaft 14c. In the illustrated embodiment, the LP compressor 12a, the LP turbine 12b, the HP turbine 14b and the HP compressor 14a are all mounted for rotation about the engine central axis A.

The LP turbine 12b is also known as the power turbine. The LP turbine 12b may drive two or more rotatable loads. According to the illustrated embodiment, the first load is a propeller 16, which provides thrust for flight and taxiing in aircraft applications. However, it is understood that the first load could be any suitable component, or any combination of suitable components, that is capable of receiving a rotational drive from the LP turbine 12b. For instance, in an alternate embodiment where the engine 10 is a turboshaft instead of a turboprop as depicted in FIG. 1, the first load could include helicopter main rotor(s) and/or tail rotor(s), pump(s), generator(s), gas compressor(s), etc.

In the embodiment shown in FIG. 1, the first load (i.e., in this case the propeller 16) is drivingly coupled to an output shaft 18 extending axially from an output end of a reduction gearbox (RGB) 20. The input end of the RGB 20 is mechanically coupled to the LP turbine shaft 12c drivingly connected to the LP turbine 12b. As shown in FIG. 1, the LP turbine shaft 12c (or simply "LP shaft" 12c) and the output shaft 18 are coaxial to the engine central axis A. The RGB 20 processes and outputs the rotational drive transferred thereto from the LP turbine 12b via the LP turbine shaft 12c through known gear reduction techniques. The RGB 20 allows for the propeller 16 to be driven at a rotational speed, which is different from the rotational speed of the LP turbine 12b, which may thereby provide for better efficiency.

In addition to the thermal engine or thermal module 28, the hybrid engine 10 also includes an electric engine or electric module 30 which provides power output to drive the propeller 16. In the embodiment of FIG. 1, the electric module 30, which may also be referred to an electric drive system 30, is drivingly engaged to the LP shaft 12c such that power extracted from the combustion gases by the LP turbine 12b and electrical power generated by the electric motor 34 are compounded to drive the rotatable load (e.g., propeller 16).

In the embodiment shown, the electric drive system 30 includes an electric motor 34 in driving engagement with the LP shaft 12c, either directly or via an eMotor gearbox 32. The electric motor(s) 34 is/are coupled to the output shaft 18 via the LP shaft 12c, the eMotor gearbox 32, and the RGB 20. Although the electric motor 34 will be referred to herein in the singular, for ease of reference, it is to be understood that two or more electric motors 34 may be provided in the hybrid engine 10.

It will be appreciated that although the engine 10 is depicted as a turboprop engine, the present disclosure also applies to a turboshaft engine. The electric motor(s) 34 may also be used as a generator.

The eMotor gearbox 32 has at least one input each drivingly engaged to a respective one of the at least one electric motor 34 and an output drivingly engage to the LP shaft 12c. In the embodiment shown, the eMotor gearbox 32 is located proximate a rear end of the thermal engine 28 relative to a direction of travel D of the hybrid engine 10. In other words, the output of the eMotor gearbox 32 is drivingly engaged to a rear end 12d of the LP shaft 12c of the thermal engine 28. In the embodiment shown, the gearbox 32 is located rearward of the air inlet 13 of the hybrid engine 10. In the present embodiment, the output shaft 18 and the electric module 30 are disposed on opposite sides of the thermal module 28. Stated differently, the LP turbine 12b is located between the propeller 16 and the HP turbine 14b. The air inlet 13 of the LP compressor 12a is located between the eMotor gearbox 32 and the LP compressor 12a. It will be appreciated that the disclosed engine may be used in as a pusher-type turboprop. In such a case, the eMotor gearbox 32 would be located at the front of the engine relative to the direction of travel.

Although FIG. 1 depicts an exemplary thermal engine 28 portion of the hybrid engine 10, alternate thermal engine or gas turbine engine configurations and architectures may be used of the thermal engine 28 of the present hybrid engine 10. For example, the thermal engine 28 of the present hybrid engine 10 may include all or part of the gas turbine engine 10 as described in US 2020/0049025 A1, the entire contents of which are incorporated herein by reference.

More particularly, a set of variable guide vanes (VGVs) may be provided upstream of the LP compressor 12a and/or upstream of the HP compressor 14a of the thermal engine 28 of the present hybrid engine 10. Each of these sets of VGVs can be independently controlled, such as by the controller 29 of the thermal engine 28, which forms part of the main engine control unit 50 of the hybrid engine 10, as will be described in further detail below. The VGVs may direct inlet air to the corresponding stage of compressor sections. Each set of VGVs may be operated to modulate the inlet airflow to the compressors in a manner which allows for improved control of the output power of the thermal engine 28, as described in more detail below. The VGVs may be provided with any suitable operating range. In some embodiments, VGV vanes may be configured to be positioned and/or modulated between about +80 degrees and about −25 degrees, with 0 degrees being defined as aligned with the inlet airflow. In a more specific embodiment, the VGV vanes may rotate in a range from +78.5 degrees to −25 degrees, or from +75 degrees to −20 degrees, and more particularly still from 70 degrees to −20 degrees. The two set of VGV vanes may be configured for a similar range of positions, or other suitable position range. In some embodiments, the VGVs upstream of the LP compressor 12a may be mechanically decoupled from the set of VGVs upstream of the HP compressor 14a, having no mechanical link between these sets of VGVS such as to permit independent operation of the respective stages. The VGVs are operatively controlled by the controller 29 of the ECU 50, so as to be operated independently of each other. Indeed, the thermal engine 28 of the hybrid engine 10 is controlled using the controller 29 of the ECU 50, to carry out the methods described in this document. For the purposes of this document, the term "independently" in respects of the VGVs means that the position of one set of the VGV vanes may be set and/or modified without effecting any change to a position of the other set of the VGVs, and vice versa.

Additionally, the LP compressor 12a of the thermal engine 28 may include a mixed flow rotor (MFR), such as that described in U.S. Pat. No. 6,488,469 B1, the entire contents of which are incorporated herein by reference.

Figure 2:
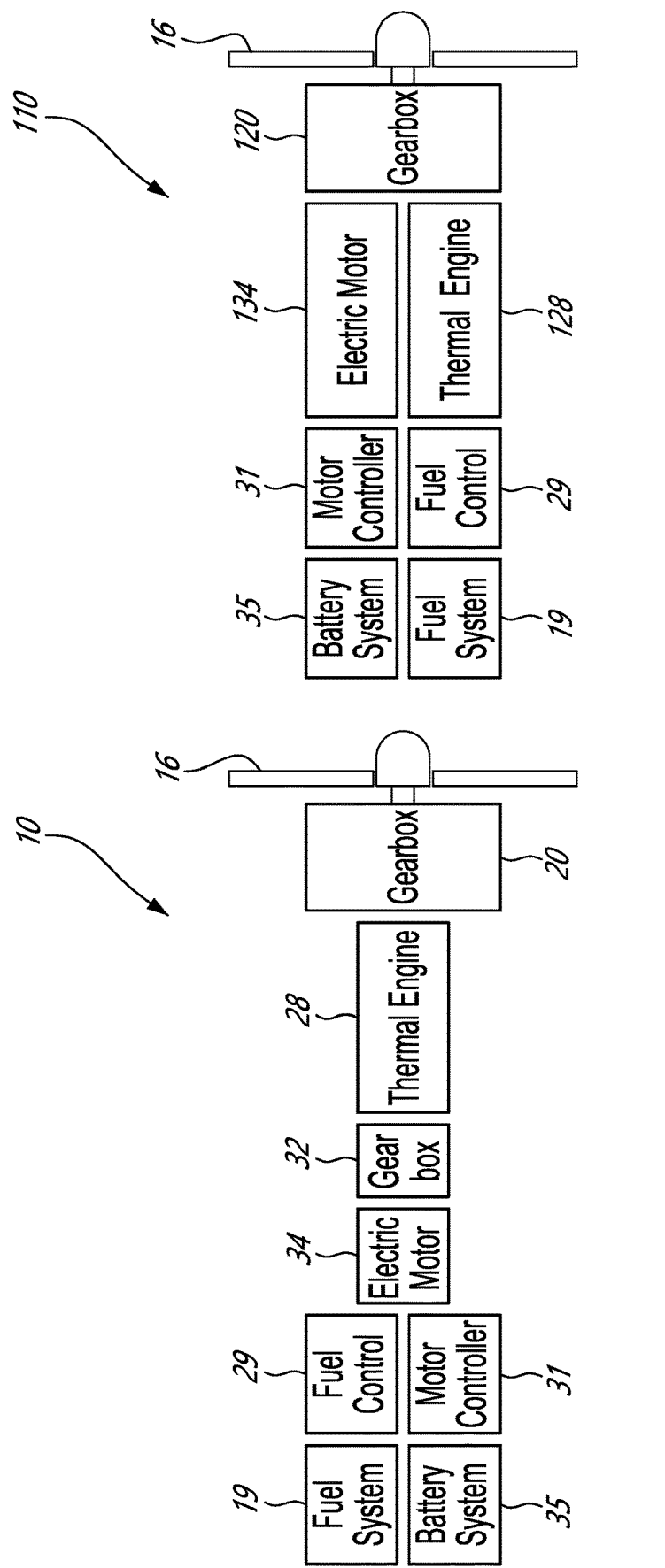
FIG. 2A is a schematic view of the hybrid aircraft engine of FIG. 1, shown with schematic representations of the controllers for the thermal engine and the electric motor.
FIG. 2B is a schematic view of a hybrid aircraft engine in accordance with another embodiment, shown with schematic representations of the controllers for the thermal engine and the electric motor.

FIG. 2A is a schematic view of the hybrid aircraft engine 10 of FIG. 1, as described above, shown with schematic representations of the controllers 29 and 31 of the thermal engine 28 and the electric motor 34, respectively. The thermal engine controller 29 and the electric motor controller 31 are respectively in communication with the fuel system 19 (i.e., of the thermal engine 28) and the battery system (i.e., for the electric motor 34).

FIG. 2B is a schematic view of a hybrid aircraft engine in accordance with an alternate embodiment, wherein the hybrid engine 110 has a parallel configuration, the thermal engine 128 and the electric motor 134 being disposed in parallel with each other, rather than having a series configuration as per the embodiment of FIGS. 1 and 2A. The thermal engine 128 and the electric motor 134 both drive a common gearbox 120, which in turn drives the propeller 16.

Regardless of their configuration, the thermal engine controller 29 and the electric motor controller 31 may be comprised within a master engine control unit 50, which forms part of a control system 200 of the hybrid engine 10, 110, as will now be described in further detail.

Figure 3:
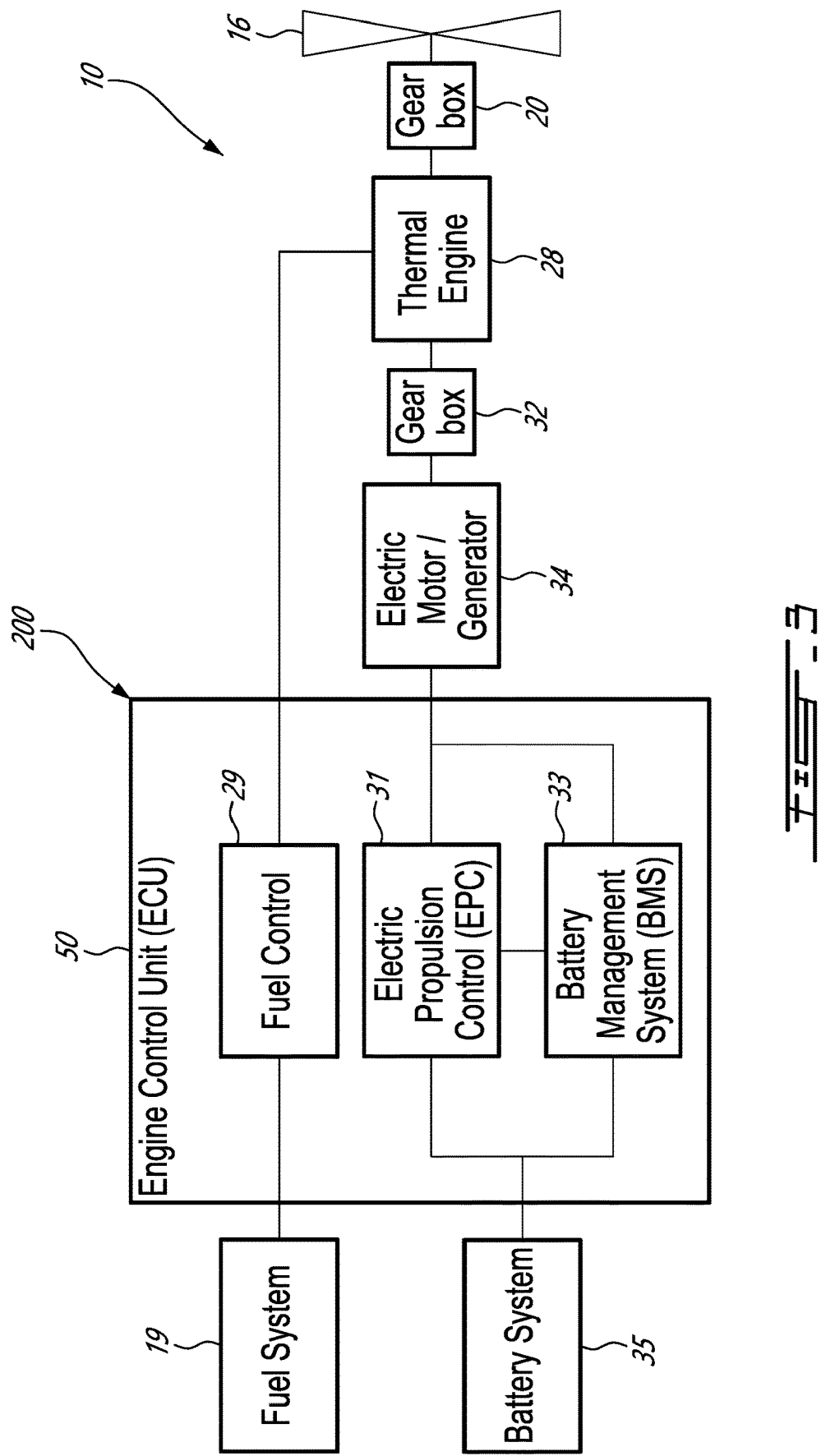
FIG. 3 is schematic view of the hybrid engine of FIGS. 1 and 2A, shown with aspects of the control system thereof.

Referring to FIG. 3, control of the hybrid engine 10 is effected by the control system 200 that includes the thermal engine controller 29 and the electric motor controller 31. These controllers 29, 31 therefore form part of the control system 200 of the hybrid engine 10, which comprises a main engine control unit (ECU) 50. The ECU 50 is the main central authority which controls all aspects of the hybrid engine 10, and thus controls the thermal engine 28 (using the thermal engine controller 29) and the electric motor(s) 34 (using the electric motor controller 31, which may also be referred to herein as the electric propulsion control (EPC)). The ECU 50 also includes and controls a battery management system (BMS) 33, which is in communication with the battery system 35 and the electric motor 34. In a particular embodiment, the ECU 50 is a full authority digital controller (FADEC) which provides full authority digital control of the various relevant parts of the hybrid engine 10 and its systems, and controls operation of the engine 10 as will be described. The ECU 50 may also be referred to herein as the FADEC 50. The ECU 50 includes software and hardware, and is configured to perform the various control methods and sequences as described in this document. Additionally, in some embodiments the ECU 50 may be configured for controlling operation of other elements of the aircraft, for instance the propeller 16 (e.g., providing propeller pitch control).

Figure 4:
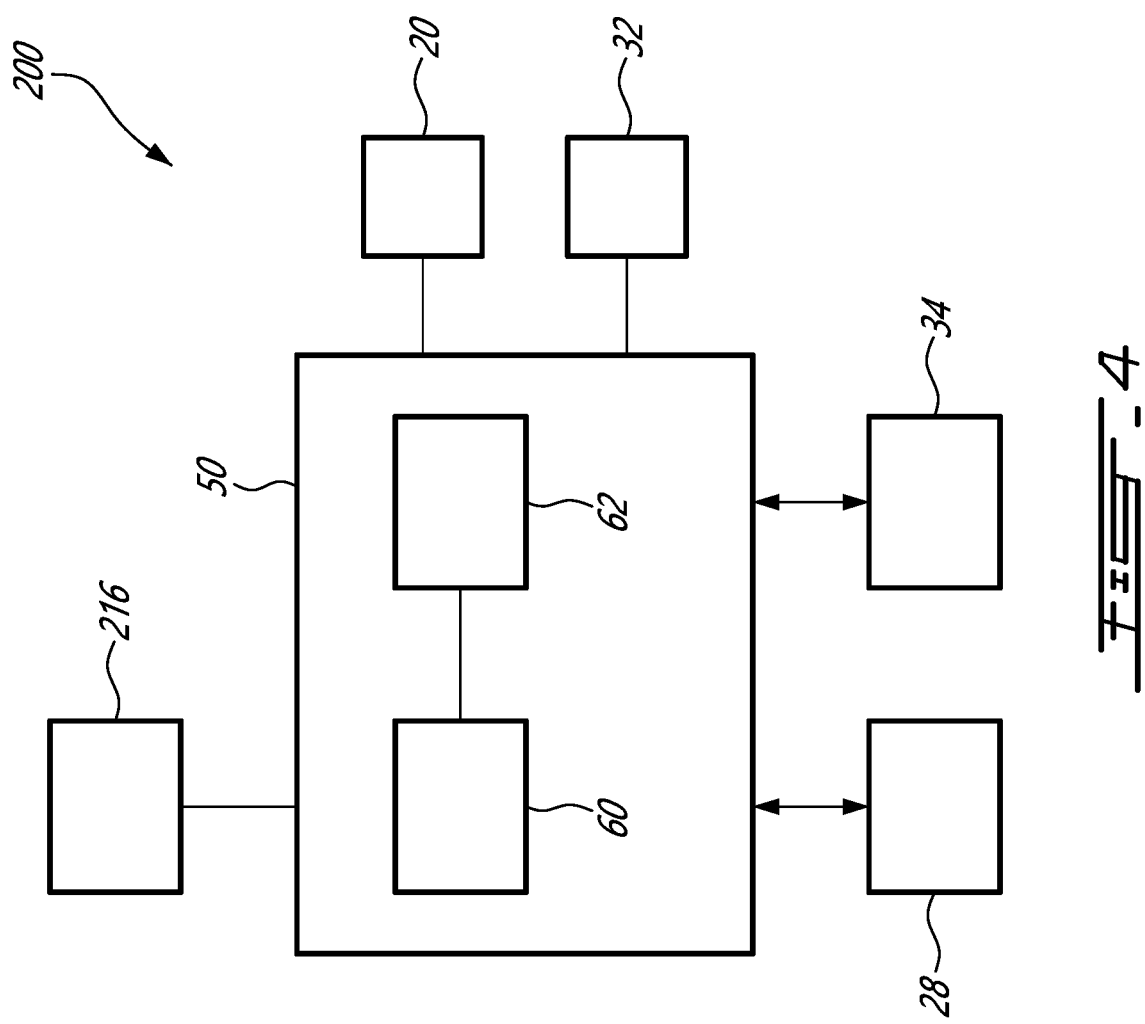
FIG. 4 is a schematic view of the control system of FIG. 3.

Referring to FIG. 4, a configuration of the ECU 50 of the control system 200 is depicted. The ECU 50 includes generally a processing unit 60 communicating with a computer-readable medium 62. The computer-readable medium 62 has instructions stored thereon executable by the processing unit 60 for controlling and operating the hybrid engine 10 as described herein.

The ECU 50 is in communication with (i.e. receives input data from and provides output instructions/data to) both the electric motor 34 and the thermal engine 28, in order to permit independent control of each of the power sources of the hybrid engine 10. This input data and out instructions may include, for example, torque and/or speed data of the electric motor 34, and torque and/or speed data of the thermal engine 28. The input data may be provided, in one embodiment, by one or more suitable sensors respectively disposed on or in the electric motor 34 and the thermal engine 28. The ECU 50 receives this data, processes it using the processing unit 60 in accordance with instructions stored on the computer-readable medium 62, and outputs instructions to the electric motor 34 and the thermal engine 28 in accordance with the programmed protocols and operating instructions of the control system. The ECU 50 may also be operatively connected to the gearboxes 20, 32 of the hybrid engine 10, via respective sensors, such as to receive input relating to their speed, torque, power output, etc. The ECU 50 also receives data input from a propeller control system 216 which controls operation of the propeller 16 (e.g., pitch control, etc.).

The instructions executable by the processing unit 60 are configured to control operation of the electric motor 34 and the thermal engine 28. That is, the ECU 50 is control the electric motor 34 to provide a selected output speed and/or torque and to control the thermal engine 28 to provide a selected fuel flow, output speed and/or output torque. The respective power outputs of the thermal engine 28 and the electric motor 34 are thus controlled by the ECU 50 of the control system 200, such as to perform the operations described herein with respect operation of the hybrid engine 10.

Both the electric motor 34 and thermal engine 28 therefore have the capability to provide power to the propeller 16, or other rotor, through the gearbox 20. However, the hybrid engine 10 may be operated such that only one of the two power sources, i.e., either the electric motor 34 or the thermal engine 28, provides motive power to the propeller 16.

The ECU 50 of the control system 200 is configured to operate the engine 10, 110 as will now be described. The ECU 50 generally serves as main control authority to set and regulate the thrust provided by the propeller 16 and drives the electric propulsion control (EPC) 31 and the battery management system (BMS) 33 as slave components, by commanding and getting feedback.

To improve the efficiency of the hybrid engine 10, it may be desirable under certain operating conditions to operate the hybrid engine 10 asymmetrically, that is by operating one power source (either the thermal engine 28 or the electric motor 34) in an active mode and operating the other power source (the other of the thermal engine 28 and the electric motor 34) in standby mode. This improved efficiency may include, for example, reducing an overall fuel burn of the thermal engine 28 by operating the thermal engine 28 in a low-power standby mode. A power source operating in the "active mode" as defined herein means that this power source provides substantially all of the power output to the reduction gearbox 20 and ultimately the propeller 16, at least a majority (i.e., greater than 50%) of the power output to the reduction gearbox 20 and ultimately the propeller 16, whereas the power source operating in the "standby mode" provides substantially none of the power output to the reduction gearbox 20 and ultimately the propeller 16. In particular, the thermal engine 28 operating in the "standby mode" may operate in a sub-idle condition to provide at most minimal propulsive power to the aircraft. Thus, in this scenario, the power source operating in the standby mode provides substantially no motive power to the aircraft. This asymmetric operation of the hybrid engine 10 may be referred to herein as a sub-idle hybrid operation (SIHO) mode.

Under certain specific operating conditions and/or during certain specific operating phases, it may be desirable to operate the hybrid engine 10 in the SIHO mode with the electric motor 34 operating in the active mode and the thermal engine operating in the standby mode. This may include, for example, when the aircraft is on the ground and the aircraft is taxiing. This taxiing operating phase may be employed when the aircraft is on the ground (e.g. at engine start-up and during taxiing). A feature of the SIHO mode of the hybrid engine 10, when the aircraft is on the ground, is the ability to run the propeller 16 of the hybrid engine 10 below the propeller's typical operation speed. This low-speed propeller operation is sufficient to enable taxiing maneuvers of the aircraft, while using a minimum required electric power produced by the electric motor 34. The taxiing feature of the hybrid engine 10 operating in the SIHO mode requires the propeller system to have adequate capacity to maintain pitch angle (i.e. oil pressure, which is provided by the thermal engine 28 operating in its standby mode) while operating at below normal propeller operation speeds.

Although in a particular embodiment the hybrid engine 10 is operating in the SIHO mode during taxiing of the aircraft (i.e., while it is on the ground), it is to be understood that the SIHO mode of the hybrid engine as described herein may also be used during other operating/flight phases, such as during take-off, in flight, during cruise, or during landing.

When the thermal engine 28 of the hybrid engine 10 is operating in its standby mode, it is operated at a speed that is less that its standard "idle" engine operating speed. This is therefore referred to as "sub-idle" operation of the thermal engine 28. At such a sub-idle operation, the thermal engine 28 is turning over only at a speed sufficient to maintain minimum oil flow within the thermal engine 28, such as to provide lubrication of mechanical systems and providing the necessary oil pressure for the propeller control system 216 such as to modulate and feather the propeller. In this mode, the thermal engine 28 runs at a very low fuel flow rate, that is only enough fuel is provided to the combustor to maintain pressure to the oil system. However, the thermal engine 28, when operating in the standby mode, remains readily available to spool up and provide increased power output to the aircraft if/when necessary. As long as the hybrid engine 10 remains in the SIHO mode, with its thermal engine 28 in its standby mode, the fuel consumption of the thermal engine remains lower than it would otherwise be if operating in an idle or above-idle running condition. The necessary motive power for the aircraft, during taxiing for example, is therefore provided to the propeller 16, via the reduction gearbox (RGB) 20, by the electric motor 34 (whether in a parallel configuration as shown in FIG. 2B or in-line through the a spool of the thermal engine 28 as shown in FIG. 2A)

The ECU 50 of the control system 200 is accordingly capable of operating the hybrid engine 10 in the SIHO mode, wherein, in one particular embodiment, the electric motor 34 functions as main power source for the propulsion/thrust while the thermal engine 28 operates in its standby mode—which is sufficient merely to ensure adequate control of the propeller 16 by the propeller control system 216 and maintain lubrication within the thermal engine 28. The control system 200 thus permits the hybrid engine 10 to be operated in an operating mode which will maximize energy efficiency, and thus the software of the control system 200 allows for dynamic changes in power split and/or rating between the thermal and electric power, provided respectively by the thermal engine 28 and the electric motor 34, for providing propulsion to the aircraft. This enables energy consumption to be optimized. For example, consumption of electric energy from the battery system 35 and/or fuel consumption of the fuel system 19 can be optimized. Additionally, the SIHO mode operation of the hybrid engine 10 enables a low environmental impact, because it makes possible very low fuel consumption when on ground (or in flight) when operating under power of the electric motor 34, while maintaining a high availability of the thermal engine 28 to run up to full power in the event that this becomes necessary (e.g., in case the electric motor 34 should fail or provide less than intended power output). Additionally, the control system 200 is capable of providing smooth transitions from electric-only to hybrid or thermal-only operation of the hybrid engine 10.

Figure 5:
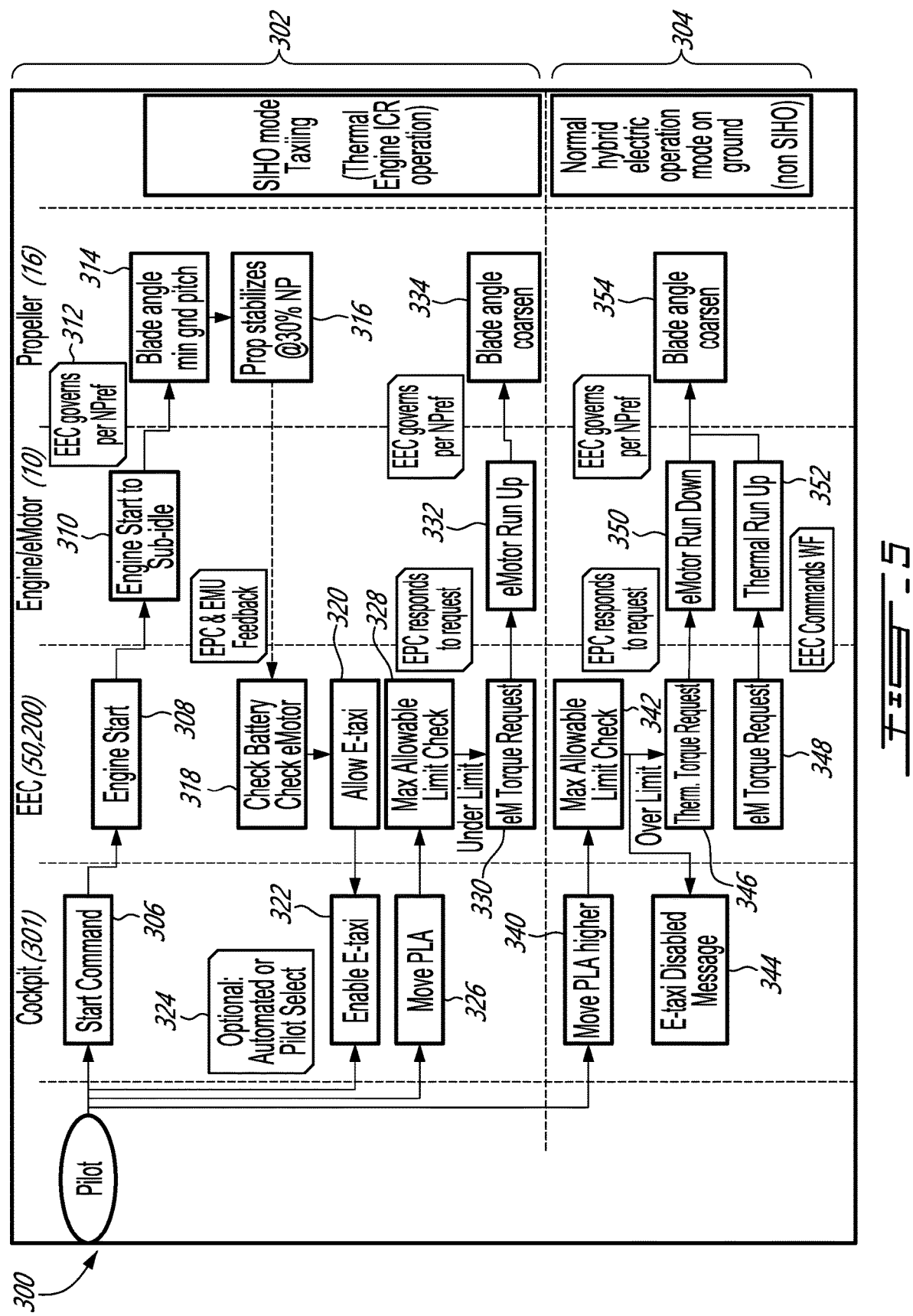
FIG. 5 is a flow chart depicting the operation of the hybrid aircraft engine in a sub-idle hybrid operation mode during a taxiing flight phase when the aircraft is on the ground.

Referring now to FIG. 5, a method 300 of operating the hybrid engine 10 will now be described, with particularly reference to operating the hybrid engine 10 in SIHO mode during a taxiing phase of operation when the aircraft is on the ground.

The pilot will first initial select whether she or he wishes to operate the hybrid engine 10 in either the SIHO mode taxiing 302 or in a normal hybrid electric operation mode 304 (i.e., non-SIHO mode, which may also be selected on-ground, if desired, or in flight). If SIHO mode taxiing 302 is selected, the pilot will actuate, within the cockpit 301, the engine start command 306 which provides the engine start instructions to the Engine Electronic Control (EEC) 50 (also referred to above as the ECU 50) of the control system 200, at 308. The EEC/ECU 50 then controls the hybrid engine 10 to start the thermal engine 28 thereof in the standby or sub-idle mode, at 310. As indicated at 312, the EEC/ECU 50 is operable to govern rotation of the thermal engine 28 to a target sub-idle rotational speed NPref. Operation of the thermal engine 28 at the sub-idle operating mode remains sufficient to provide oil pressure to the propeller control system 216 (see FIG. 4) so as to modulate and control the blade angle of the blades of the propeller 16, at 314. This may include, for example, controlling a minimum propeller blade pitch during taxiing on the ground. The EEC/ECU 50 may also, at 316, control the propeller control system 218 to stabilize the propeller speed at approximately 30% of the standard propeller speed NP. In certain embodiments, the propeller speed NP at 316 communicated, in a feedback loop, to the EEC/ECU 50 which checks both the battery system 35 and the electric motor 34, at step 318, to ensure sufficient battery charge levels and proper functioning of same. Once this has been verified by the EEC/ECU 50 at step 318, the EEC/ECU 50 will then allow the "E-taxi", at step 320, it will allow operation of the hybrid engine 10 in the SIHO mode, using power of the electric motor 34 with the thermal engine in the standby mode as defined above. This information is communicated back to the cockpit 301, at step 322, that E-taxi has been enabled under the SIHO mode of operation. As shown at 324, then enabling of E-taxi, at 322, may either be a pilot selected function—i.e. activated by the pilot from the cockpit 301—or may be an automated function controlled by the EEC/ECU 50.

In parallel, and when E-taxi has been enabled at 322, when the pilot moves the power lever in the cockpit 301, thereby modifying/moving the power lever angle (PLA) output, at step 326, this PLA output is fed to the EEC/ECU 50. The EEC/ECU 50 then conducts a check, at 328, of the maximum allowable power output, as reflected by the PLA data, in order to ensure that the power requirements requested by the pilot are not greater than a predetermined threshold permitted for SIHO and E-taxi operation. When the EEC/ECU 50 determines that the power requirements selected by the pilot are, in fact, under the acceptable threshold limit, the EEC/ECU 50 will send a torque request to the electric motor 34, at step 330. The EEC/ECU 50 then controls the electric motor 34 of the hybrid engine 10 to accelerate (or "run up") the electric motor 34, at step 332. The electric motor 34 will then be providing substantially most or all of the propulsive power to the propeller 16, with the thermal engine 28 provided only limited output sufficient to operate the propeller control system 218 which actuates the propeller blades to change their pitch angles, at 334—namely by coarsening the blade pitch angles—which will increase forward propulsion of the aircraft. The hybrid engine 10 will thus be running in the SIHO or E-taxing mode, with the electric motor 34 being in its active mode and the thermal engine 28 in its standby mode, as defined above.

If or when the pilot wishes to operate the hybrid engine 10 in the normal hybrid electric operation mode 304 (i.e., non-SIHO mode), the power lever is actuated by the pilot in the cockpit to increase the PLA, at 340. The EEC/ECU 50 receives this higher power request demand, in the form of the PLA data, and verifies, at 342, whether the power level request is greater than a predetermined threshold permitted for SIHO and E-taxi operation. If the power requested is greater than this limit, the EEC/ECU 50 provides a message within the cockpit, at 344, that SIHO mode and E-taxi is disabled. The EEC/ECU 50 determines and transmits the required torque output to be provided by the thermal engine, at 346, and the required torque output to be provided by the electric motor, at 348. The EEC/ECU 50 accordingly controls the hybrid engine 10 such as to split the power supplied by each of the power sources, in a manner determined to be most suitable and/or to maximize efficiency. This may involve, for example, decreasing the power output provided by the electric motor, at 350, and increasing the power output provided by the thermal engine, at 352. The EEC/ECU 50 will then control the hybrid engine 10 and the propeller control system 216 to modulate the propeller blade pitch angle as appropriate, at 354. This may include, for example, coarsening the blade pitch angles such as to increase forward propulsion of the aircraft.

Figure 6:
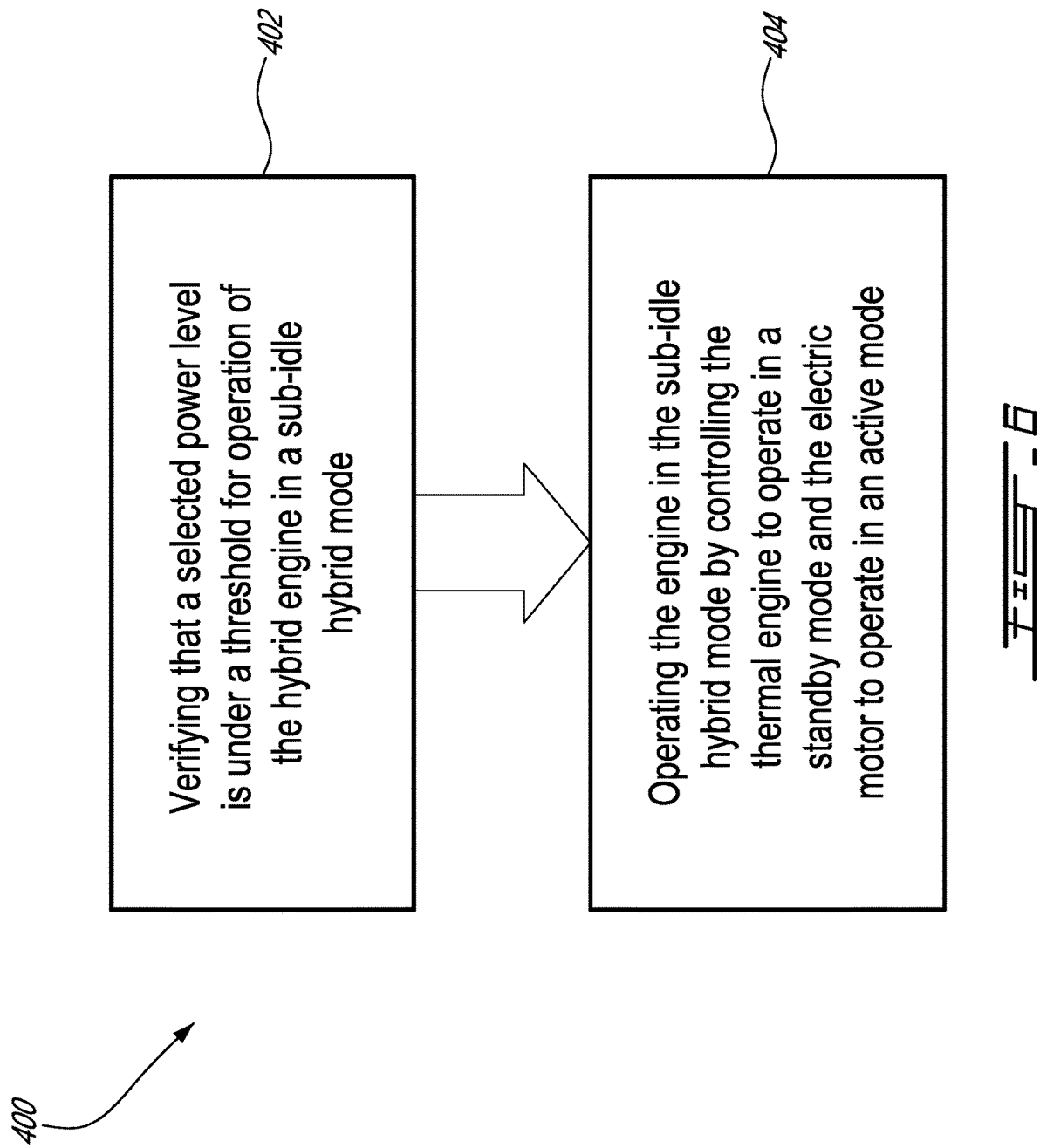
FIG. 6 is a flowchart of an example method for operating the hybrid aircraft engine of FIG. 1.

Referring now to FIG. 6, a method 400 of operating the hybrid engine 10 which includes a thermal engine 28 and an electric motor 34 is depicted. The method includes a step 402 of verifying, using an engine control unit (ECU) 50 of the hybrid engine 10, that a selected power level is under a predetermined threshold for operation of the hybrid engine in an asymmetric or sub-idle hybrid operation (SIHO) mode, as described above. Then, at step 404, the engine control unit 50 is used to operate the hybrid engine 10 in the SIHO mode, wherein the electric motor 34 of the engine provides substantially all propulsive power to the aircraft and the thermal engine 28 provides substantially no propulsive power to the aircraft. Substantially no propulsive power, as defined herein, is understood to mean that the standby engine provides at most 10% of the total propulsive power output, but this may be less than 5% and alternately may be zero. This is done by controlling the thermal engine to operate in its standby mode, as defined above, and controlling the electric motor to operate in an active mode. It is however to be understood that in certain alternate embodiments, when the engine 10 is controlled to operate in the SIHO mode, the thermal engine may be operated in its active mode to provide propulsive power to the aircraft—whether or not the electric engine provides any additional power to the aircraft.

The method may also include using the ECU 50, which may be a full authority digital control (FADEC), to control the thermal engine 28 and the electric motor 34 of the hybrid engine 10 such that they operate asymmetrically in the SIHO mode. The ECU 50 may determine that the aircraft is in a suitable condition for entering asymmetric mode, such as by determining that the aircraft is on the ground and/or ready for taxiing and/or that required power level is below a required level. The ECU may then accelerate one of the two power sources (such as the electric motor 34) into an active mode, in which case the electric motor provides sufficient power to satisfy all or substantially all (90% or higher) of the aircraft power or rotor speed demand. The other engine (in this case, the thermal engine 28) is run in its standby mode wherein it provides a power output lower than it would during a standard idle running condition. In some embodiments, the thermal engine may provide zero propulsive power to the aircraft and in other embodiments less than 10% output power relative to a reference power (provided at a reference fuel flow).

When the thermal engine 28 is operated in its standby mode and the engine 10 operating in the SIHO mode, the ECU 50 may control a fuel flow rate to the thermal engine accordingly. This SIHO mode fuel flow (and/or a fuel flow rate) provided to the combustor of the thermal engine 28 when operating in its standby mode is controlled to be between 70% and 99.5%, or optionally between 75% and 85%, less than the fuel flow (and/or the fuel flow rate) provided to the combustor of the thermal engine 28 when in a full power (e.g., takeoff) operating mode. In the SIHO mode, therefore, the thermal engine 28 operating in the standby mode may provide between 70% and 99.5%, or optionally between 70% and 90%, or more optionally between 80% and 90%, less power output from the thermal engine that it would when operating in its full power condition.

Once the hybrid engine 10 is operating in the SIHO mode, the ECU 50 may monitor and modulate fuel flow to the thermal engine 28 to keep the standby engine within the desired fuel flow range. Although the desired target points for fuel flow herein are described relative to the fuel flow of the thermal engine when operated at maximum power output (e.g., takeoff power output) or alternately relative to a fuel flow to the thermal engine 28 when operating a standard on-ground idle speed, in practice the actual target fuel flow ranges for the engines may be set and managed by the ECU 50 using any suitable approach, such as to targets defined during design and development of the engine, rather than based on real time or other data from the operation of the other engine. In some embodiments, the thermal engine 28 operating in the standby mode may be controlled (closed loop) by using the target fuel flow rate as a control input variable to the ECU 50. In some embodiments, when the electric motor 34 is providing all or substantially all of the power/propeller speed demand of the aircraft, the ECU 50 may control the electric motor 34 by using alternate methods, such as controlling (closed loop) on power, or propeller speed demand of the aircraft or other suitable control variable as the (or one of the) control input variable(s) for the active or standby engine.

Alternately, in some embodiments, the step of controlling either the thermal engine 28 or the electric motor 34 to operate in a standby mode, during SIHO mode operation of the hybrid engine 10, may include controlling the standby engine (e.g. the thermal engine 28) to operate at a power in a range of 0% to 1% of a rated full-power of the thermal engine. In such an embodiment, the thermal engine operating in its standby mode may be controlled (closed loop) by the ECU 50 by using the target output power of the engine or other suitable parameters.

Figure 7:
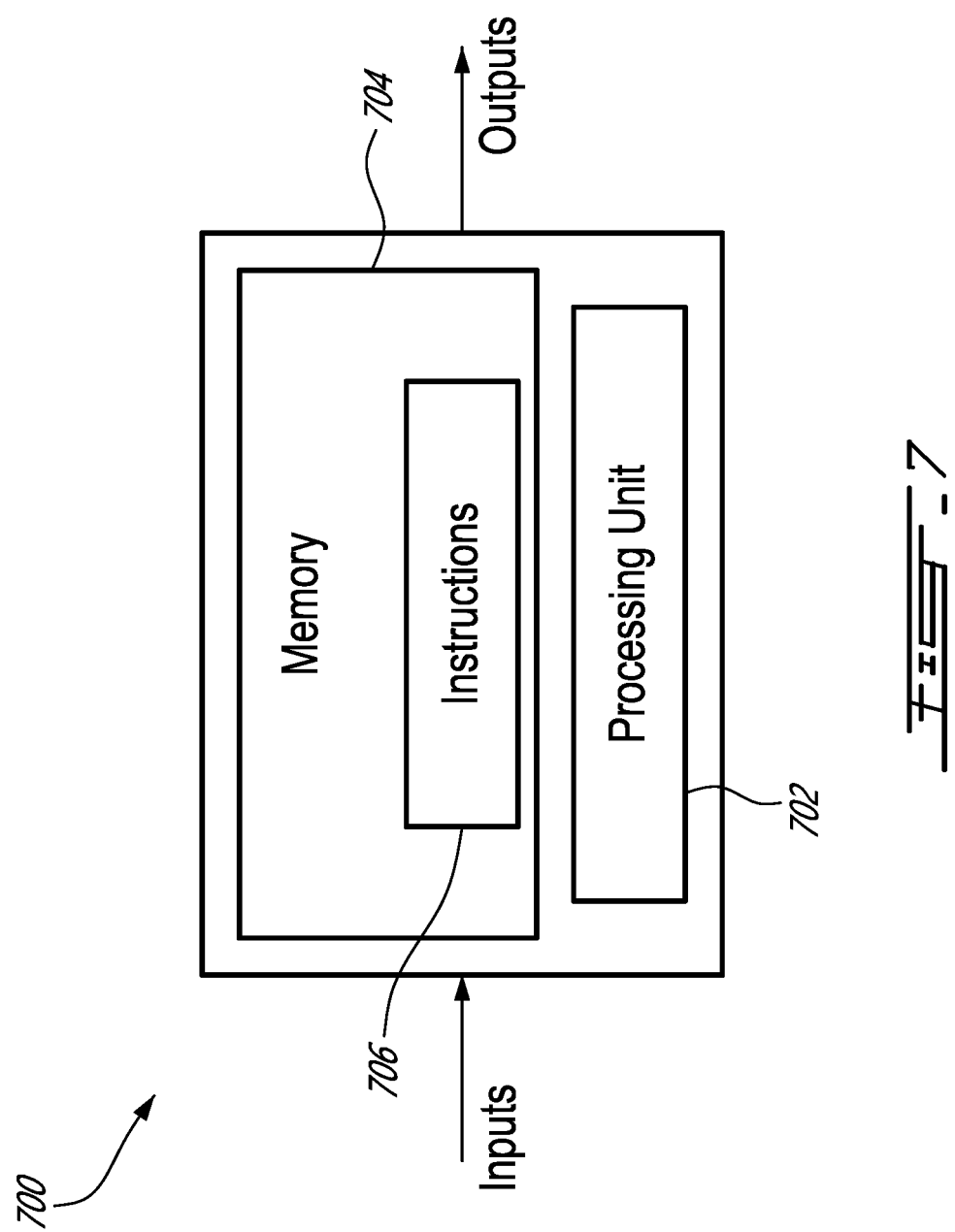
FIG. 7 is a block diagram of an example computing device.

In some embodiments, the above-described methods may be implemented in a computing device 700, an example of which is illustrated in FIG. 7. For simplicity only one computing device 700 is shown but the control system 200 may include more computing devices 700 operable to exchange data. The computing devices 700 may be the same or different types of devices. The controllers 29, 31 may be implemented with one or more computing devices 700.

The computing device 700 comprises a processing unit 702 and a memory 704 which has stored therein computer-executable instructions 706. The processing unit 702 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 704 may comprise any suitable known or other machine-readable storage medium. The memory 704 may comprise non-transitory computer readable storage medium, for example, but not limited to, an electronic, magnetic, optical, electromagnetic, infrared, or semiconductor system, apparatus, or device, or any suitable combination of the foregoing. The memory 704 may include a suitable combination of any type of computer memory that is located either internally or externally to the device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 704 may comprise any storage means (e.g., devices) suitable for retrievably storing machine-readable instructions 706 executable by processing unit 702.

Computer-executable instructions 706 may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of operating a hybrid engine for an aircraft, the hybrid engine having a thermal engine and an electric motor, the method comprising:

verifying, using an engine control unit of the hybrid engine, that a selected power level is under a predetermined threshold for operation of the hybrid engine in a sub-idle hybrid mode;

operating the hybrid engine in the sub-idle hybrid mode, using the engine control unit, by controlling the thermal engine to operate in a standby mode, and by controlling the electric motor to operate in an active mode wherein the electric motor provides a majority of a propulsive power to the aircraft, wherein in the standby mode the thermal engine operates in a sub-idle condition to provide at most minimal propulsive power to the aircraft;

verifying, using the engine control unit of the hybrid engine, that the selected power level is at or above the predetermined threshold for operation of the hybrid engine in the sub-idle hybrid mode; and in response to the selected power level being at or above the predetermined threshold for operation of the hybrid engine in the sub-idle hybrid mode, using the engine control unit to operate the thermal engine and the electric motor at a baseline operating mode, wherein both the thermal engine and the electric motor contribute at least a minimal propulsive power to the aircraft.

2. The method as defined in claim 1, wherein operating the hybrid engine in the sub-idle hybrid mode further includes controlling the electric motor to provide substantially all of the propulsive power to the aircraft and controlling the thermal engine to provide substantially no propulsive power to the aircraft.

3. The method as defined in claim 1, wherein controlling the thermal engine to operate in the standby mode includes operating the thermal engine at a minimum required speed to maintain a minimum oil flow within the thermal engine.

4. A method of operating a hybrid engine for an aircraft, the hybrid engine having a thermal engine and an electric motor, the method comprising:

verifying, using an engine control unit of the hybrid engine, that a selected power level is under a predetermined threshold for operation of the hybrid engine in a sub-idle hybrid mode;

operating the hybrid engine in the sub-idle hybrid mode, using the engine control unit, by controlling the thermal engine to operate in a standby mode, and by controlling the electric motor to operate in an active mode wherein the electric motor provides a majority of a propulsive power to the aircraft, wherein in the standby mode the thermal engine operates in a sub-idle condition to provide at most minimal propulsive power to the aircraft;

wherein controlling the thermal engine to operate in the standby mode includes operating the thermal engine at a minimum required speed to maintain a minimum oil flow within the thermal engine; and wherein the aircraft includes a propeller, and the operating the thermal engine at the minimum required speed to maintain the minimum oil flow within the thermal engine includes operating the thermal engine at a sufficient speed to provide oil pressure to a propeller control system so as to modulate and control a blade angle of blades of the propeller.

5. The method as defined in claim 1, further comprising, prior to the verifying that the selected power level is under the predetermined threshold for operation of the hybrid engine in the sub-idle hybrid mode and the operating the hybrid engine in the sub-idle hybrid mode, receiving a signal indicative of a request to enable the operating of the engine in the sub-idle hybrid mode.

6. The method as defined in claim 5, wherein the receiving the signal indicative of the request to enable the operating of the engine in the sub-idle hybrid mode includes receiving a signal indicative of a pilot-activated request to enable the operating of the engine in the sub-idle hybrid mode.

7. The method as defined in claim 5, wherein the receiving the signal indicative of the request to enable the operating of the engine in the sub-idle hybrid mode includes the engine control unit detecting a taxiing flight phase of the aircraft and automatically generating the signal indicative of the request to enable the operating of the engine in the sub-idle hybrid mode.

8. The method as defined in claim 1, wherein controlling the thermal engine to operate in the standby mode includes the thermal engine providing at most ten percent of the propulsive power to the aircraft.

9. The method as defined in claim 1, wherein controlling the thermal engine to operate in the standby mode includes controlling a fuel flow rate to a combustor of the thermal engine to be between 75% and 85% of a fuel flow rate provided to the combustor of the thermal engine when in a full power operating mode.

10. The method as defined in claim 1, wherein controlling the thermal engine to operate in the standby mode includes operating the thermal engine at a rotational speed less than an idle speed of the thermal engine.

11. A method of operating a hybrid turboprop engine for an aircraft, the hybrid turboprop engine having a thermal engine, an electric motor and a propeller control system in communication with a propeller, the method comprising:

verifying, using an engine control unit of the hybrid turboprop engine, that a selected power level is under a predetermined threshold for operation of the hybrid turboprop engine in a sub-idle hybrid mode;

using the engine control unit to operate the hybrid turboprop engine in the sub-idle hybrid mode, wherein the electric motor provides a majority of the propulsive power to the aircraft, by controlling the thermal engine to operate in a standby mode and the electric motor to operate in an active mode, wherein the thermal engine operating in the standby mode provides at most minimal propulsive power to the aircraft but generates output to operate the propeller control system;

verifying, using the engine control unit of the hybrid engine, that the selected power level is at or above the predetermined threshold for operation of the hybrid engine in the sub-idle hybrid mode; and in response to the selected power level being at or above the predetermined threshold for operation of the hybrid engine in the sub-idle hybrid mode, using the engine control unit to operate the thermal engine and the electric motor at a baseline operating mode, wherein both the thermal engine and the electric motor contribute at least a minimal propulsive power to the aircraft.

12. The method as defined in claim 11, wherein using the engine control unit to operate the hybrid turboprop engine in the sub-idle hybrid mode further includes controlling the electric motor to provide substantially all of the propulsive power to the aircraft and controlling the thermal engine to provide substantially no propulsive power to the aircraft.

13. The method as defined in claim 11, wherein controlling the thermal engine to operate in the standby mode includes operating the thermal engine at a minimum required speed to maintain a minimum oil pressure within the propeller control system.

14. The method as defined in claim 13, wherein operating the thermal engine at a minimum required speed to maintain a minimum oil pressure within the propeller control system includes operating the thermal engine at a sufficient speed to provide oil pressure to a propeller control system so as to modulate and control a blade angle of propeller blades.

15. The method as defined in claim 11, further comprising, prior to the verifying that the selected power level is under the predetermined threshold for operation of the hybrid engine in the sub-idle hybrid mode and the using the engine control unit to operate the hybrid turboprop engine in the sub-idle hybrid mode, receiving a signal indicative of a request to enable the operating of the engine in the sub-idle hybrid mode.

16. The method as defined in claim 15, wherein the receiving the signal indicative of the request to enable the operating of the engine in the sub-idle hybrid mode includes receiving a signal indicative of a pilot-activated request to enable the operating of the engine in the sub-idle hybrid mode.

17. The method as defined in claim 10, wherein controlling the thermal engine to operate in the standby mode includes the thermal engine providing at most ten percent of the propulsive power to the aircraft.

18. A method of operating a hybrid turboprop engine for an aircraft, the hybrid turboprop engine having a thermal engine, an electric motor, a propeller, and a propeller control system, the method comprising:

during a selected flight segment of the aircraft, using an engine control unit of the hybrid turboprop engine to control a first one of the thermal engine and the electric motor to operate in a standby mode, the thermal engine operating in the standby mode including the thermal engine operating at a minimum required speed to maintain a minimum oil flow within the thermal engine to provide oil pressure to the propeller control system so as to modulate and control a blade angle of blades of the propeller, and to control the other of the thermal engine and the electric motor to provide a majority of the propulsive power to the propeller required for the selected flight segment; and upon completion of the selected flight segment, using the engine control unit to return the first one of the thermal engine and the electric motor to a baseline operating mode, wherein both the thermal engine and the electric motor contribute propulsive power to the propeller.

* * * * *